(12) United States Patent
Hartman

(10) Patent No.: US 7,077,608 B2
(45) Date of Patent: Jul. 18, 2006

(54) SYSTEM FOR MOUNTING A MACHINE TOOL IN A HOLDER

(75) Inventor: David Hartman, Dundee, NY (US)

(73) Assignee: Parlec, Inc., Fairport, NY (US)

( * ) Notice: Subject to any disclaimer, the term of this patent is extended or adjusted under 35 U.S.C. 154(b) by 137 days.

(21) Appl. No.: 10/829,604

(22) Filed: Apr. 22, 2004

(65) Prior Publication Data

US 2005/0238451 A1    Oct. 27, 2005

(51) Int. Cl.
*B23C 5/22* (2006.01)
*B23P 11/02* (2006.01)

(52) U.S. Cl. .................. 409/234; 279/83; 279/102; 29/447; 408/239 R

(58) Field of Classification Search ............... 409/234, 409/232; 29/447; 279/102–103, 83; 408/239 A, 408/239 R, 238, 240; 403/273
See application file for complete search history.

(56) References Cited

U.S. PATENT DOCUMENTS

| | | | | |
|---|---|---|---|---|
| 35,618 A * | 6/1862 | Mix | ............................. | 279/83 |
| 182,178 A * | 9/1876 | Disston | ........................ | 83/838 |
| 1,958,817 A * | 5/1934 | Gase | ............................. | 279/83 |
| 3,202,433 A * | 8/1965 | Davis | ......................... | 409/232 |
| 3,994,615 A * | 11/1976 | Narang | ........................ | 279/83 |
| 5,150,636 A * | 9/1992 | Hill | ............................. | 29/447 |
| 5,277,435 A * | 1/1994 | Kramer et al. | ................ | 29/447 |
| 5,582,494 A | 12/1996 | Cook | | |
| 5,876,158 A * | 3/1999 | Beiter | ......................... | 279/83 |
| 6,312,201 B1 * | 11/2001 | Nagaya et al. | .............. | 409/234 |
| 6,340,274 B1 * | 1/2002 | Shimomura et al. | .......... | 29/447 |
| 6,394,466 B1 * | 5/2002 | Matsumoto et al. | ........ | 279/103 |
| 6,488,456 B1 * | 12/2002 | Satran et al. | ............... | 409/234 |
| 6,871,859 B1 * | 3/2005 | Lundblad et al. | ........... | 279/102 |
| 2002/0009342 A1 * | 1/2002 | Vasudeva | .................... | 408/226 |
| 2003/0075879 A1 * | 4/2003 | Lundblad et al. | ........... | 279/102 |

FOREIGN PATENT DOCUMENTS

WO    WO-01/45883 A2 *    6/2001

* cited by examiner

*Primary Examiner*—Erica Cadugan
(74) *Attorney, Agent, or Firm*—Neal L. Slifkin; Robert C. Brown

(57) ABSTRACT

A system for mounting a tool in a tool holder for high-precision centering of the tool and positive restraint of the tool from rotation within the holder. The tool holder includes a cylindrical aperture having a diameter slightly less than the diameter of the shank of a cylindrical tool. The tool is installed into the tool holder by heating the tool holder to a temperature sufficient to increase the aperture diameter sufficiently to accept the tool shank. The tool shank is further provided with an angular flat for engagement with a set screw to prevent the tool from being turned in the holder in use. Preferably, a second tool flat is provided opposite the first flat and extending to the end of the tool shank for orientation of the tool by a second set screw during insertion of the tool into the tool holder.

3 Claims, 4 Drawing Sheets

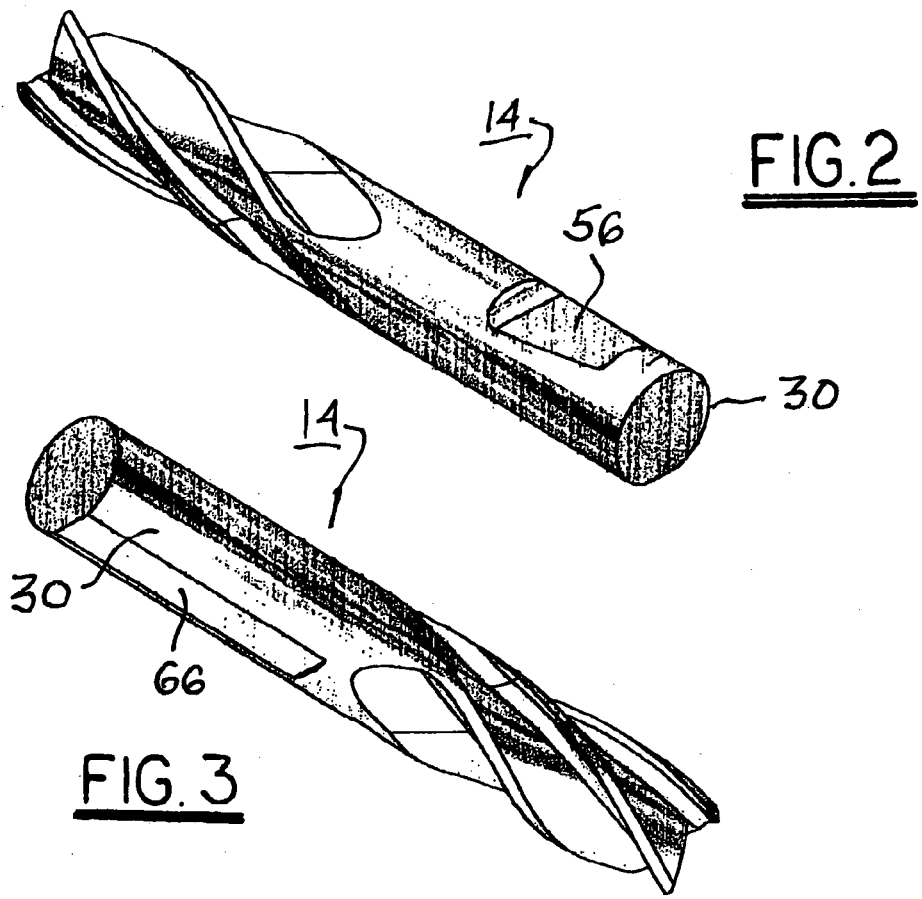
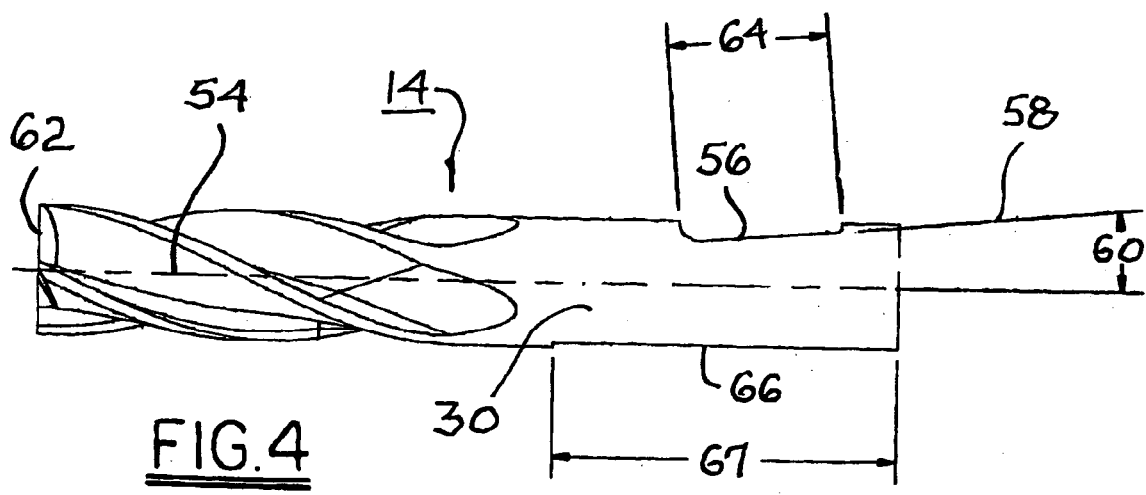

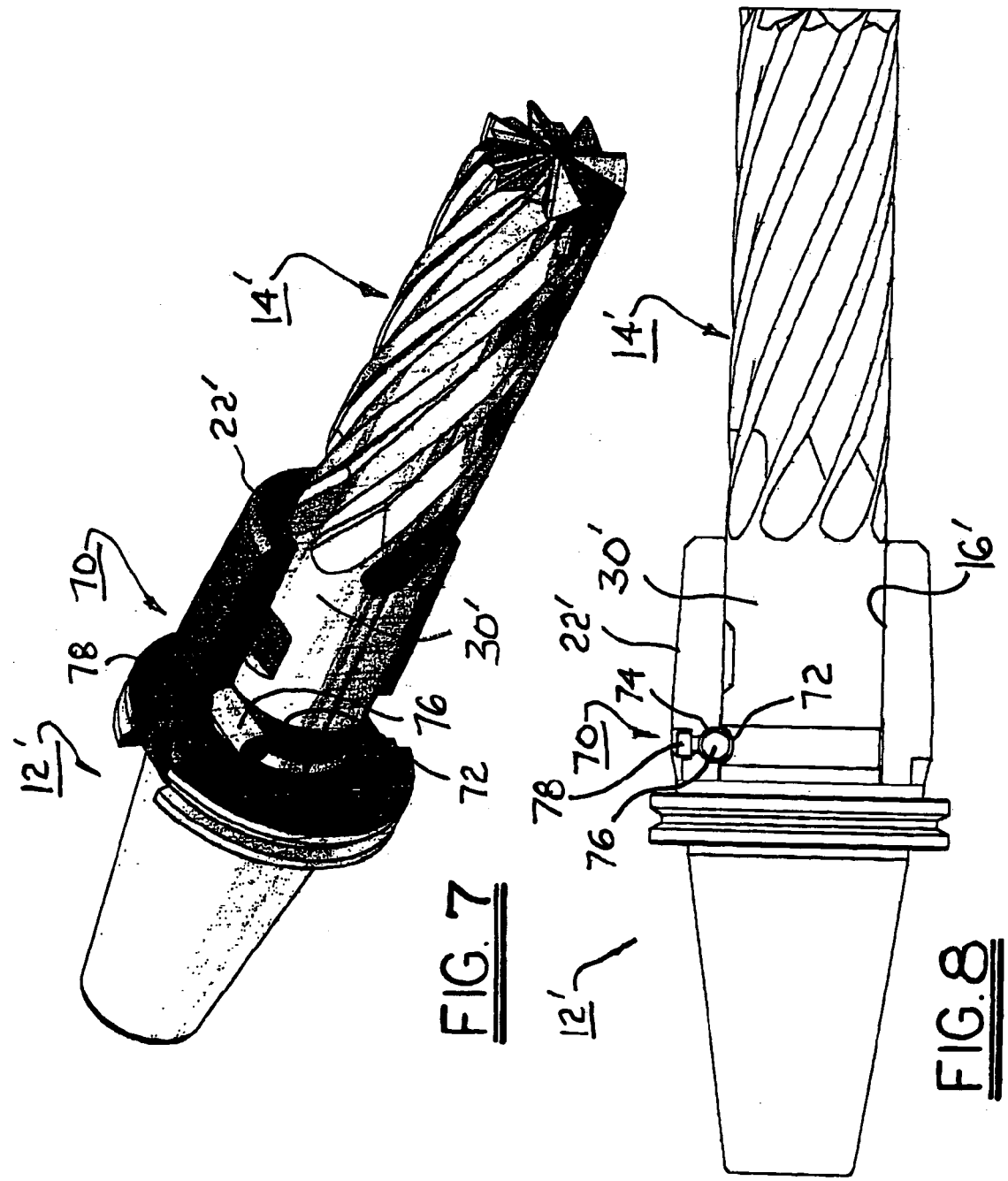

SYSTEM FOR MOUNTING A MACHINE TOOL IN A HOLDER

FIELD OF THE INVENTION

The present invention relates to means for retaining a machine tool in a tool holder for use in a machining apparatus; more particularly, to means for centering and retaining a cylindrical tool in a tool holder; and most particularly, to apparatus for centering and positively restraining a cylindrical tool in a cylindrical opening of a tool holder to a very high degree of centration.

BACKGROUND OF THE INVENTION

It is known in the art of tool mounting to dispose a changeable cutting tool in a drivable tool holder provided as part of a cutting machine, for example, a drill press, milling machine, hollow milling machine, lathe, punch press, or the like. In rotating applications, ideally the tool is a) perfectly centered on the axis of rotation of the holder, which is the machine spindle axis, and b) restrained by positive restraint means to prevent the tool from being turned within the holder as a result of torque loads imposed during cutting operations. Unfortunately, in the prior art either of these criteria may be met, to a high degree of success, but typically not both.

In the known art, a tool having a cylindrical shank may be restrained from turning by a tool holder or chuck having three radially-retractable equilaterally-arranged jaws that grip the tool by exerting radial force. For even more positive anti-rotation means, the tool shank may be formed hexagonally rather than cylindrically, or may be provided with one or more flats for receiving one or more set screws in the holder. Such mounting means can provide a high level of rotational restraint but inadequate centering capability for high-precision machining.

For high-precision centering in the known art, such that the tool axis is concentric with the machine spindle, one approach is the use of a shrink fit tool holder that provides an interference fit between the shank of the cutting tool and internal diameter of a cylindrical aperture in the tool holder. The fit may be enhanced by forming the aperture at an inner diameter slightly less than the outer diameter of the tool shank, and then heating the holder to increase the inner diameter such that it will accept the tool. When the holder is again cool, the tool is firmly gripped within the aperture. See U.S. Pat. No. 5,582,494 ('494) issued Dec. 10, 1996 to Cook, which is incorporated herein by reference. When the tool is assembled into the holder in this fashion, recited in the '494 patent as a second embodiment, the tool will run true to the internal diameter of the holder provided that the holder is accurately manufactured to a high level of concentricity between the tool aperture and a shank of the tool holder for mounting onto the machine itself.

The '494 patent also discloses as a first embodiment the use of an axial backing screw arrangement within the tool holder for setting the milling height of the tool, and also an angularly inclined flat on the tool, engageable by an angled set screw in the tool holder, for securing the tool against the backing screw, ensuring the set height, and preventing the tool from backing out of the holder aperture.

The '494 patent teaches and claims in claim 1 that the tool may be rotationally restrained within the aperture solely by friction between the tool shank and aperture wall. Thus, the '494 patent specifically teaches away from using additional means for positively restraining the tool against rotation in the holder. However, experience in using tools and tool holders in accordance with this invention has shown that shrink fitting alone can be inadequate to restrain the tool from rotation within the tool holder under some high torque loads. We have found that a positive means for restraining rotation can be useful, and in fact necessary, in combination with shrink-fit centering of the tool in sustaining high torque loads on the tool.

What is needed in the art is a means for mounting a tool in a tool holder wherein the tool axis has a high degree of concentricity with the tool holder axis and wherein the tool is simultaneously positively restrained from rotation within the tool holder.

OBJECT OF THE INVENTION

It is a principal object of the invention to provide a system for centering and retaining a tool in a tool holder wherein the tool is accurately centered in the tool holder and is also positively restrained from rotation within the tool holder.

SUMMARY OF THE INVENTION

Briefly described, a system for mounting a tool in a tool holder in accordance with the invention combines a means for centering the tool in the tool holder and a means for positive restraint of the tool from rotation within the tool holder. "Positive restraint" as used herein means any mechanical interference within the tool holder interacting with the tool to prohibit such rotation. A tool holder in accordance with the invention includes a cylindrical aperture having a diameter at working temperature slightly less than the diameter of the shank of a cylindrical tool to be retained therein. To install the tool into the tool holder aperture, the tool holder is heated to a temperature sufficient to increase the pocket diameter sufficiently to accept the tool shank.

In a first exemplary embodiment, positive restraint of the tool shank is provided by a first longitudinal flat for engagement with a set screw provided in the tool holder to prevent the tool from being turned in the pocket in use. Preferably, the flat is formed at an angle to the tool axis to assist in retaining the tool axially within the holder. Preferably, a second shank flat opposite the first flat is engaged by a set screw in the holder to assist in orienting the tool correctly during assembly and to permit precise centering of the tool in the aperture. Optionally, the holder may include an axial adjustment means for varying the depth of the aperture as desired, to vary thereby the extension of the tool from the aperture.

In a second exemplary embodiment, positive restraint is provided by a circumferential groove extending part way around the tool near the base of the tool. The groove receives a tangential pin through a passage in the tool holder. During shrink fitting of the tool into the holder, the pin is inserted into the tool and then the tool is rotated in the holder until the pin binds in the groove, thus preventing any further rotation of the tool in the holder during use. The tool and holder are then cooled to immobilize the tool and pin in that relationship.

All other mechanical means for positive restraint from rotation are fully comprehended by the invention.

DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 2 is an isometric view from above of a tool in accordance with the invention;

FIG. 3 is an isometric view from below of the tool shown in FIG. 2;

FIG. 4 is a detailed elevational cross-sectional view of the tool shown in FIGS. 1 through 3;

FIG. 7 is an isometric view from above of a second embodiment of a system for tool mounting in accordance with the invention; and FIG. 8 is a detailed elevational cross-sectional view of the system shown in FIG. 7.

DETAILED DESCRIPTION OF THE INVENTION

Figure 1:
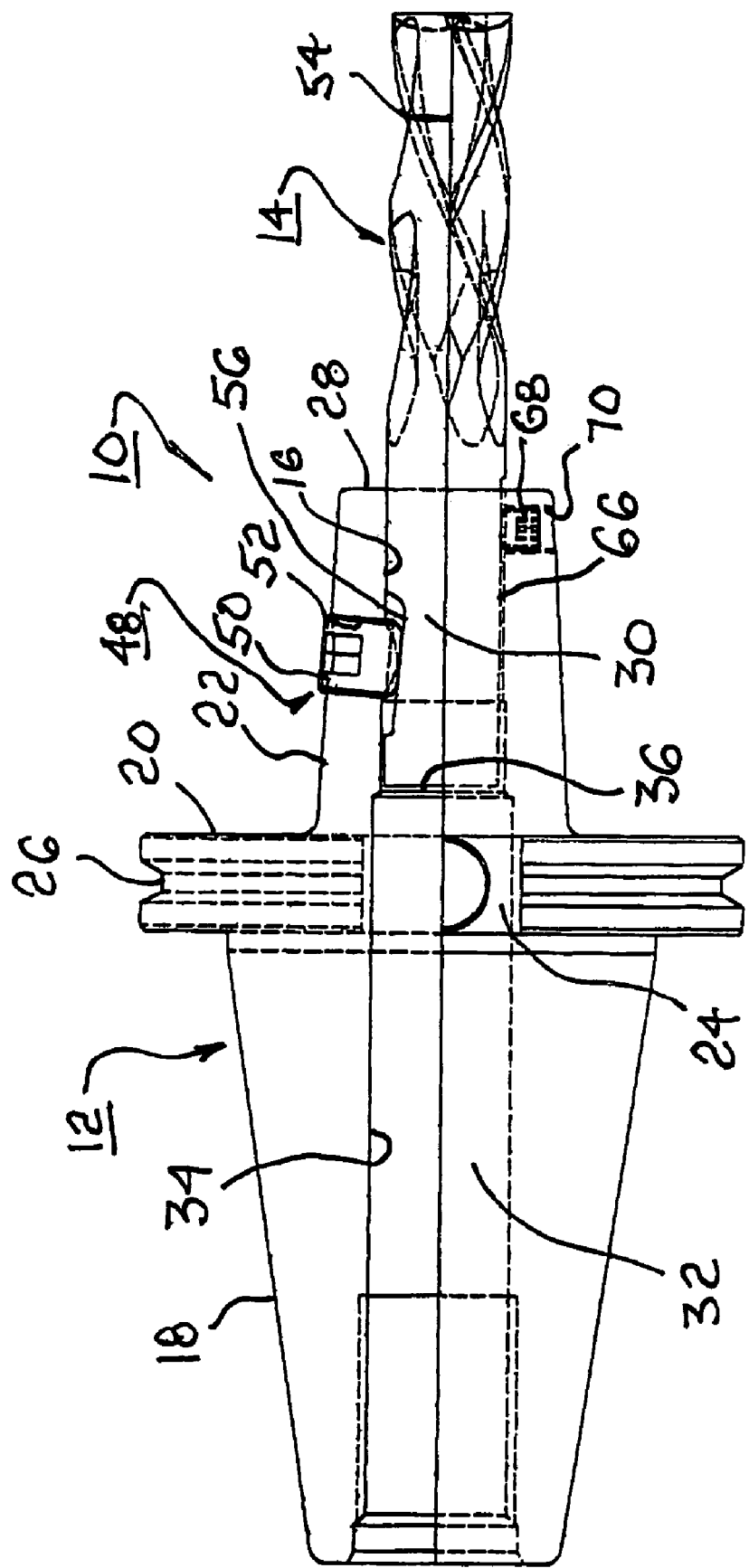
FIG. 1 is an elevational cross-sectional view of a first embodiment of a system for tool mounting in accordance with the invention.
Figure 5:
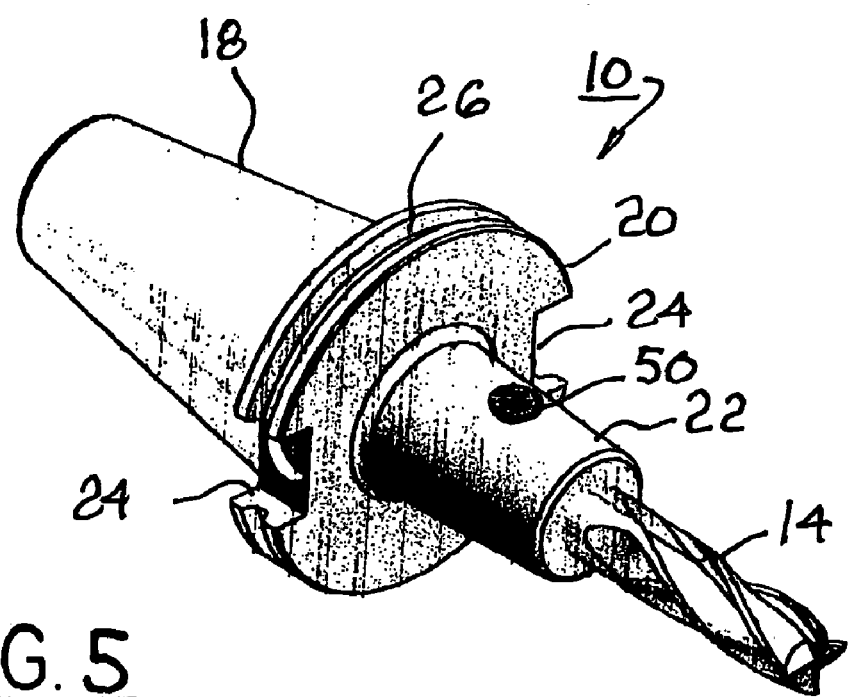
FIG. 5 is an isometric view from above of the system shown in FIG. 1.
Figure 6:
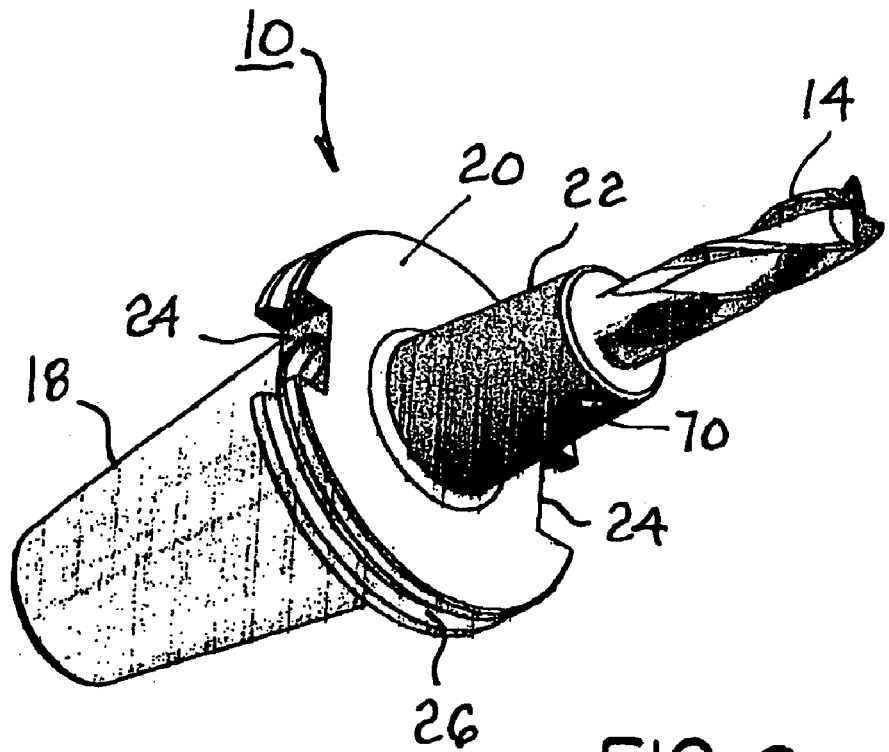
FIG. 6 is an isometric view from below of the system shown in FIGS. 1 and 5.

Referring to FIGS. 1 through 6, a first system 10 for mounting a tool in accordance with the invention includes a tool holder 12 and a tool 14 adapted for holding by holder 12 in a axial aperture 16 in holder 12.

Holder 12 may be substantially as shown in the '494 patent and is depicted for purposes of explanation herein as comprising a prior art standard Caterpiller V-flange tool holder but additionally may comprise an American standard, European standard DN, or Japanese standard BT type tool holder. As is conventional with all of the standard tool holders, tool holder 12 includes a tapered shank portion 18, a flange portion 20, and cutting tool mounting portion 22. Flange portion 20 includes a pair of mounting recesses 24 as well as a circumferentially-extending V-shaped recess 26. As is well known, recess 26 allows an automated tool holder changer (not shown) to carry and contact tool holder 12 for automatic removal and insertion of holder 12 from the spindle of a milling machine (not shown). Recesses 18 each receive a drive lug (not shown) of the machine spindle to transmit rotary motion to the tool holder when mounted in the machine spindle.

Holder portion 22 includes axial aperture 16 that extends from the distal end 28 of portion 22 axially toward the opposite end of the tool holder to a depth approximately commensurate with the location of flange portion 20. The diameter of aperture 16 is sized to be between about 0.0002" and 0.0005" smaller than the diameter of shank 30 of tool 14 when the holder and the tool are at room temperature. Shank 30 has a smooth outer surface and a substantially uniform diameter over its engagement length with portion 22.

Preferably, holder 12 includes apparatus, referred to generally as 32, disposed within an axial bore 34 for setting the depth of a bottom 36 of aperture 16, to set the extensive height of tool 14 from holder 12 after assembly thereinto. For example, apparatus 32 may be substantially as disclosed in FIGS. 7 and 8 of the '494 patent incorporated herein by reference and need not be elaborated upon further. The correct setting for apparatus 32 for any given tool in a particular tool holder is predetermined by measurement, and the position of apparatus 32 is set before insertion of tool 14 into holder 12.

To mount shank 30 of tool 14 into aperture 16, tool holder portion 22 is heated externally as by way of a gas flame or electric heating element (not shown). Due to the thermal expansion characteristics of tool holder 12, the application of external heat causes the diameter of axial aperture 16 to increase in an amount sufficient to allow shank 30 to be press fit into aperture 16, bottoming against apparatus 32 (in some applications it can be desirable also to contract the initial diameter of shank 30 by chilling to a temperature below 0° C. prior to such insertion). Following insertion, the external application of heat is discontinued and the tool holder and tool are allowed to cool back to ambient temperature wherein thermal contraction causes aperture 16 to form a rigid interface between tool holder 12 and tool shank 30. Accordingly, tool 14 is highly centered in tool holder 12.

The just-described apparatus and procedure is fully disclosed in the '494 patent. However, that disclosure teaches that the "rigid interface" so formed by shrink fitting is sufficient to prevent rotation of the tool in the holder under conditions of use. To the contrary, we have found that under high torque loads, the tool may in fact be caused to rotate within aperture 16, which is highly undesirable.

Therefore, in addition to the just described shrink fitting means, in accordance with the present invention additional means are provided to positively restrain tool shank 30 from rotation within aperture 16.

"Positive restraint" as used herein means any mechanical interference within the tool holder interacting with the tool to prohibit such rotation. All such means are comprehended by the present invention. Two such means are exemplarily disclosed as follows.

Referring again to FIGS. 1 through 6, in a first positive restraint means 48, a set screw 50 is provided in a threaded bore 52 in tool holder portion 22 that preferably but not necessarily intersects axis 54 of tool 14. Tool shank 30 is provided with an axially-extending flat 56 which is engageable by set screw 50 to positively retain shank 30 against rotation in aperture 16. Preferably, flat 56 is formed in a plane 58 inclined at an angle 60 to axis 54, preferably about 50, plane 58 being inclined toward tool cutting end 62 and forming a so-called "whistle-notch" flat. The angle of the flat assures that tool 14 cannot axially back out of holder 12 during use. Preferably, flat 56 extends over a length 64 sufficient to engage screw 50 over the full useful range of insertion depths of shank 30 into aperture 16.

Preferably, tool shank 30 is provided with a second flat 66 extending along a length 67 opposite whistle-notch flat 56, and tool holder portion 22 is provided with a second set screw 68 in a second threaded bore 70 opposite screw 50 and bore 52. Screw 68 is useful in angularly orienting shank 30 for entering into aperture 16 and then maintaining that orientation during the shrink-fit assembly thereto, thereby assuring that flat 56 will be properly presented rotationally to screw 50. After assembly, screw 68 may be removed.

Referring to FIGS. 7 and 8, in a second positive restraint means 70 comprising a conventional pin lock arrangement, tool shank 30' of a tool 14' is provided with a circumferential groove 72 extending part way but not fully around shank 30' at a short axial distance from the end thereof. A tool, for example, meeting ANSI B94-19-1968 American National Standard Pin Lock Shanks for End Mills, is suitable for use in the present invention.

A tool holder 12' is arranged similar to tool holder 12 in all respects, including being adapted for shrink fitting of a tool into an aperture as described above for holder 12 and tool 14, but omitting the set screws and threaded bores required for first means 48. Instead, tool holder portion 22' is provided with a transverse bore 74 positioned to be substantially tangential of the bottom of circumferential groove 72 such that a pin 76 when inserted into bore 74 also engages the tool via groove 72. During shrink-fit assembly of the tool into the tool holder, the tool is bottomed in aperture 16' with groove 72 open to bore 74. Pin 76 is inserted, and tool 14' is rotated in aperture 16' in a rotational direction opposite to the rotational direction of the tool when in use, until pin 76 binds at the conclusion of partially circumferential groove 72. The tool is then positively restrained from further rotation with respect to the tool holder, in accordance with the invention. Preferably, a set screw 78 is provided in a threaded radial bore in holder portion 22' for positively retaining pin 76 in bore 74 and groove 72.

From the foregoing description it will be apparent that there has been provided a significant improvement in the art of high-precision centering and retaining of a tool in a tool holder. Variations and modifications of the herein described method, in accordance with the invention, will undoubtedly suggest themselves to those skilled in this art. Accordingly, the foregoing description should be taken as illustrative and not in a limiting sense.

What is claimed is:

1. A system for mounting a machine tool in a tool holder, comprising:
   a) means for shrink-fit centering of said tool in said tool holder;
   b) means for positive restraint of said tool from rotation within said tool holder, including a first flat formed on a shank of said tool extending into an aperture in said tool holder, and a first set screw disposed in a first threaded bore in said tool holder for engaging said first flat; and
   c) a second flat formed on said tool shank extending longitudinally from the end thereof and a second set screw disposed in a second threaded bore in said tool holder for cooperating with said second flat to angularly orient said tool during insertion of said tool into said holder, wherein said first flat is formed at an angle to the longitudinal axis of said tool.

2. A system in accordance with claim 1 wherein said means for shrink-fit centering comprises:
   a) said tool, having a cylindrical shank portion defining a continuous, uniform outer surface of substantially constant diameter; and
   b) said tool holder, having a conically tapered end portion and a tool mounting portion, said mounting portion including a central aperture extending therein, the diameter of said central aperture absent said tool shank portion being less than said diameter of said shank portion,
   wherein said tool holder is formed of a material having thermal expansion and contraction characteristics such that the application of heat to said mounting portion thermally increases the diameter of said central aperture to allow said shank portion to be inserted into said aperture to a desired position,
   wherein cooling of said tool holder after said tool insertion causes a rigid interface between the inner surface of said central aperture and the outer surface of said shank portion.

3. A system in accordance with claim 1 wherein said angle is about five degrees.

* * * * *